Patented Dec. 23, 1930

1,786,172

UNITED STATES PATENT OFFICE

LOUIS M. ROEG, OF WORCESTER, MASSACHUSETTS, ASSIGNOR TO BREWER & COMPANY, INCORPORATED, OF WORCESTER, MASSACHUSETTS

MERCURY DERIVATIVE OF TETRA-IODO-FLUORESCEIN

No Drawing.      Application filed November 11, 1927.   Serial No. 232,703.

The invention relates to a novel therapeutic germicidal agent, comprising essentially the mono-mercury derivative of tetra-iodo-fluorescein, or an alkali-metal salt of such derivative, and especially the stable neutral alkali salt, and to the process of preparing same.

For a full understanding of the invention I will describe in detail a preferred mode of practicing the same, it being understood however that the invention is not restricted to the precise conditions specified by way of example.

15 gm. of commercial erythrosine, namely, sodium salt of tetra-iodo-fluorescein (sodium salt of iodeosine) is thoroughly mixed with 40 cc. of cold water. To this is added 0.3 gm. sodium hydroxide dissolved in 5 cc. of water, and stirred to a smooth consistency resulting in a thin colloidal dispersion.

Mix 4.5 gm. of mercuric oxide with 5 cc. of glacial acetic acid in 10 cc. of water, and warm slightly to effect solution. Cool and filter. Then add while stirring the mercury solution to the erythrosine dispersion. Then add 3 cc. of glacial acetic acid to prevent its becoming neutral and poisonous. A curdy precipitate forms which becomes a smooth paste on continued stirring.

Dilute with water up to about 100 cc. and boil for 5 hours, or until a small portion of filtered solution gives no test for mercury when treated with ammonium sulphide. Then filter hot and wash the precipitate with hot water until free from soluble products.

It can be dried at about 110° C. forming a dark red powder. It is insoluble in the usual solvents but dissolves in sodium hydroxide solution yielding a deep purple-red solution. However, as the product is chiefly used as a germicidal application for cuts, bruised skin, and local infection, mostly in the form of a solution as an alkali salt, especially as a stable neutral sodium salt, the filter is broken and the precipitate is washed through and up to about 300 cc. with cold water. To prepare this preferred stable neutral sodium salt no more than 25 cc. of normal sodium hydroxide solution is added, which makes a clear purple-red solution. Finally dilute with water to 800 cc. and adjust with additional water so that each 100 cc. will contain exactly 0.5 gm. of mercury or practically 2% neutral sodium salt of mono-mercury tetra-iodo-fluorescein. Then filter, preferably through paper.

This 2% solution when tested against a resistant strain of staphylococcus aureus acts as an absolute germicide even in only one minute of exposure. The test organism used was of such a resistant strain that it survived 10 minutes exposure and failed to survive 15 minutes exposure to phenol diluted 1 to 70.

I claim:—

1. The herein described novel products having germicidal therapeutic properties comprising a neutral stable alkali-metal salt of the mono-mercury derivative of tetra-iodo-fluorescein without any excess of alkali.

2. The process of preparing a mercury derivative of tetra-iodo-fluorescein comprising reacting with mercuric acetate on an aqueous suspension of tetra-iodo-fluorescein and adding an excess of acetic acid while heating to prevent its becoming poisonous.

In testimony whereof, I affix my signature.

LOUIS M. ROEG.